R. MASSON.
Tobacco Pipe.
No. 55,321.
Patented June 5, 1866.
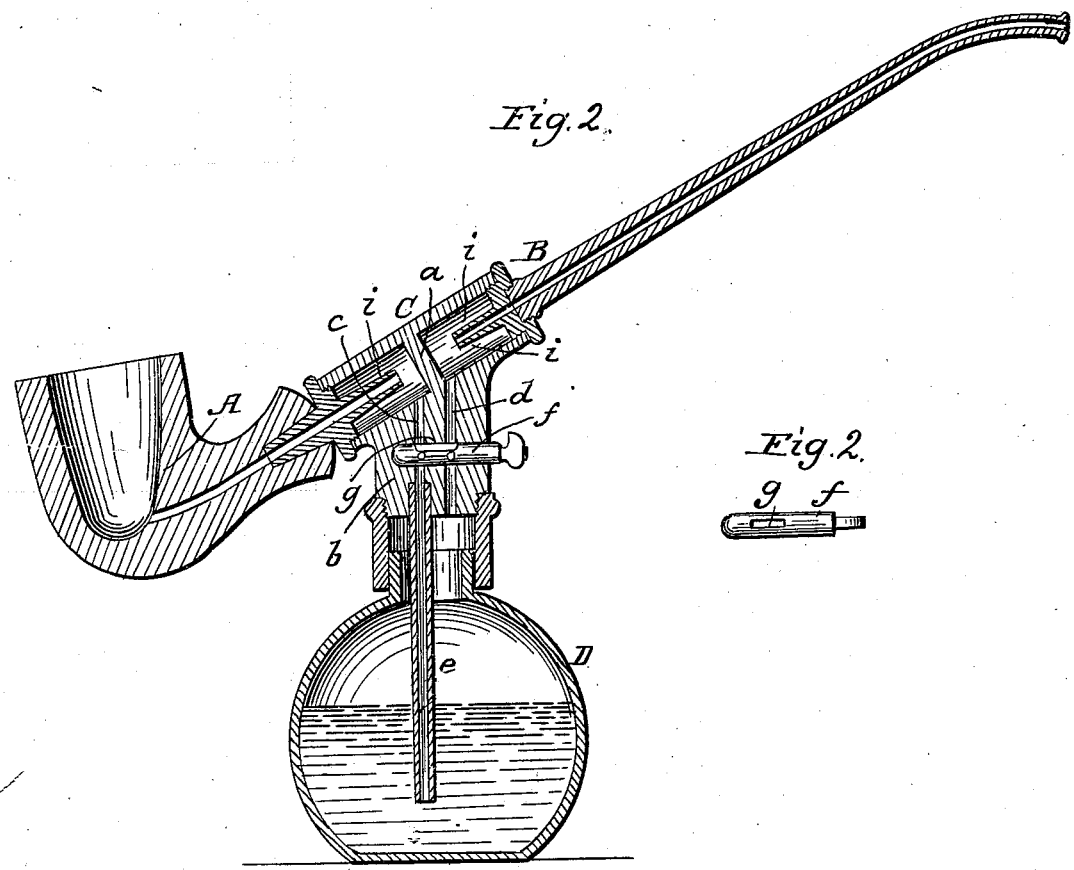

UNITED STATES PATENT OFFICE.

RENE MASSON, OF TREMONT, NEW YORK.

TOBACCO-PIPE.

Specification forming part of Letters Patent No. 55,321, dated June 5, 1866.

*To all whom it may concern:*

Be it known that I, RENE MASSON, of Tremont, in the county of Westchester and State of New York, have invented a new and Improved Smoking-Pipe; and I do hereby declare that the following is a full, clear, and exact description thereof, which will enable others skilled in the art to make and use the same, reference being had to the accompanying drawings, forming part of this specification, in which—

Figure 1 represents a longitudinal vertical section of this invention. Fig. 2 is a detached side elevation of the stop-cock.

Similar letters of reference indicate like parts.

This invention relates to a smoking-pipe in which a globe or vial of glass or other suitable material is secured to the stem between the bowl and the mouth-piece, in combination with a tube extending from the stem drawn into said globe or vial, and with a partition above said tube in such a manner that when the globe or vial is filled with water the smoke is compelled to pass down through said water before it is allowed to reach the mouth-piece, and a pipe is obtained which combines the advantages of the Persian nargile in a small compass. A suitable stop-valve enables the smoker to close the communication between the water-vessel and the stem, so that when he carries the pipe in his pocket the water is not permitted to run out. Said stop-cock is so arranged that by turning it to the proper position a direct communication between the mouth-piece and bowl is effected, so that the smoker is enabled to start the pipe or to increase the draft whenever it may be necessary.

A represents the bowl of my pipe, which connects with the stem B by means of an intermediate chamber, C. This chamber is provided with a transverse partition, *a*, and from its lower side extends a nipple, *b*, to which a globe or vial, D, is secured by a screw-thread or any other suitable means. This globe communicates through channels *c d* with both compartments of the chamber C, and from the lower channel, *c*, extends a pipe, *e*, nearly down to the bottom of the globe D, so that when said globe is supplied with water the smoke from the bowl has to pass through the water before it is permitted to reach the mouth-piece of the pipe.

A suitable stop-cock, *f*, serves to open and close the channels *c d*, and this cock is so constructed that the communication between the globe D and the chamber C can be shut off, and still the channel *c* is brought to communicate with the channel *d* through the oblong cavity *g*, as shown in the drawings. If the stop-cock is brought in this position, the smoker is enabled to blow down into the bowl or to increase the draft in any other suitable manner, or to draw the smoke up without passing the same through the water. If the pipe is carried in the pocket, the stop-cock prevents the escape of the water from the globe D.

The products of condensation and the saliva collect in the chamber C, and to prevent them from running back to the bowl or up into the stem, nipples *i* are applied to the inner surfaces of the heads of said chamber, as clearly shown in Fig. 1 of the drawings.

By this arrangement a pipe is obtained which can be carried conveniently in the pocket, and which combines the advantages of the Persian nargile in a small compass.

I do not claim, broadly, the application of a globe or vial to the stem of a smoking-pipe; but

What I claim as new, and desire to secure by Letters Patent, is—

1. The pipe *e*, extending down near to the bottom of the globe B, when the same is applied in combination with the bowl and stem of a smoking-pipe and with the chamber C, substantially as and for the purpose described.

2. The plug or stop-cock *f*, in combination with the channels *c d*, chamber C, globe D, and with the bowl and stem of a smoking-pipe, constructed and operating substantially as and for the purpose described.

The above specification of my invention signed by me this 1st day of March, 1866.

RENE MASSON.

Witnesses:
M. M. LIVINGSTON,
ALEX. F. ROBERTS.